US012585500B2

(12) United States Patent
Watanabe et al.

(10) Patent No.: US 12,585,500 B2
(45) Date of Patent: Mar. 24, 2026

(54) RESOURCE ALLOCATION OF A TASK

(71) Applicant: KIOXIA CORPORATION, Tokyo (JP)

(72) Inventors: Daiki Watanabe, Kawasaki (JP); Kenji Shirakawa, Tokyo (JP); Takeshi Ishihara, Yokohama (JP)

(73) Assignee: Kioxia Corporation, Tokyo (JP)

( * ) Notice: Subject to any disclaimer, the term of this patent is extended or adjusted under 35 U.S.C. 154(b) by 708 days.

(21) Appl. No.: 17/897,095

(22) Filed: Aug. 26, 2022

(65) Prior Publication Data

US 2023/0305898 A1 Sep. 28, 2023

(30) Foreign Application Priority Data

Mar. 22, 2022 (JP) ................................. 2022-046057

(51) Int. Cl.
G06F 9/50 (2006.01)

(52) U.S. Cl.
CPC .... G06F 9/5038 (2013.01); *G06F 2209/5021* (2013.01)

(58) Field of Classification Search
CPC ....................... G06F 9/5038; G06F 2209/5021
See application file for complete search history.

(56) References Cited

U.S. PATENT DOCUMENTS

| | | | |
|---|---|---|---|
| 10,310,898 B1 | 6/2019 | Helstroom et al. | |
| 10,949,261 B2 | 3/2021 | Yang | |

| | | | | |
|---|---|---|---|---|
| 2005/0204358 A1* | 9/2005 | Hellerstein | ............... | G06F 8/60 |
| | | | | 718/104 |
| 2008/0229318 A1* | 9/2008 | Franke | ................... | G06F 9/505 |
| | | | | 718/104 |
| 2009/0319253 A1* | 12/2009 | Phillips | .................. | G06F 30/34 |
| | | | | 703/16 |
| 2010/0115523 A1* | 5/2010 | Kuschel | ................. | G06Q 10/06 |
| | | | | 718/103 |
| 2011/0035753 A1* | 2/2011 | Palczak | ............... | G06F 11/3688 |
| | | | | 718/104 |
| 2015/0379072 A1* | 12/2015 | Dirac | .................... | G06N 20/00 |
| | | | | 707/693 |
| 2016/0357964 A1* | 12/2016 | Mulchandani | ........ | G06F 21/556 |
| 2017/0372252 A1* | 12/2017 | Arora | ............ | G06Q 10/063112 |
| 2018/0143858 A1* | 5/2018 | Sanjabi | ................... | H04L 47/83 |
| 2020/0411170 A1* | 12/2020 | Brown | .................. | G06N 20/00 |

(Continued)

FOREIGN PATENT DOCUMENTS

| | | |
|---|---|---|
| JP | 5983623 B2 | 9/2016 |
| JP | 6926540 B2 | 8/2021 |

*Primary Examiner* — April Y Blair
*Assistant Examiner* — Jonathan R Labud
(74) *Attorney, Agent, or Firm* — Kim & Stewart LLP

(57) ABSTRACT

In a resource allocation control device, a dependency information acquisition unit acquires dependency information indicating subdivided process items that constitute a task and a dependency of the process items. A resource information acquisition unit acquires resource information that is information indicating what kind of resource allocation is possible for the task. A score calculation unit calculates a score for a processing procedure of the process items based on the dependency information, and the resource allocation. A search unit searches for a combination of which the score is excellent. An output unit outputs resource allocation corresponding to the excellent score found by the search unit.

4 Claims, 7 Drawing Sheets

(56) References Cited

U.S. PATENT DOCUMENTS

| | | | |
|---|---|---|---|
| 2022/0207301 A1* | 6/2022 | Iwata | ..................... G06N 3/045 |
| 2023/0244537 A1* | 8/2023 | Wang | ..................... G06F 9/505 |
| | | | 718/1 |

* cited by examiner

TASK EXECUTION SYSTEM

1

RESOURCE
ALLOCATION
CONTROL DEVICE

2

3

TASK EXECUTION DEVICE

31

SERVER DEVICE
(SERVER 1)

32

SERVER DEVICE
(SERVER 2)

2

RESOURCE ALLOCATION CONTROL DEVICE

21

DEPENDENCY INFORMATION
ACQUISITION UNIT

22

RESOURCE INFORMATION
ACQUISITION UNIT

23

SEARCH UNIT

24

SCORE CALCULATION UNIT

25

OUTPUT UNIT

FIG. 3

| TYPE/PERFORMANCE INFORMATION FOR COMPUTING UNIT |
| --- |
| TYPE/PERFORMANCE INFORMATION FOR MEMORY AND STORAGE |
| CONFIGURATION/PERFORMANCE INFORMATION FOR NETWORK |

FIG. 4

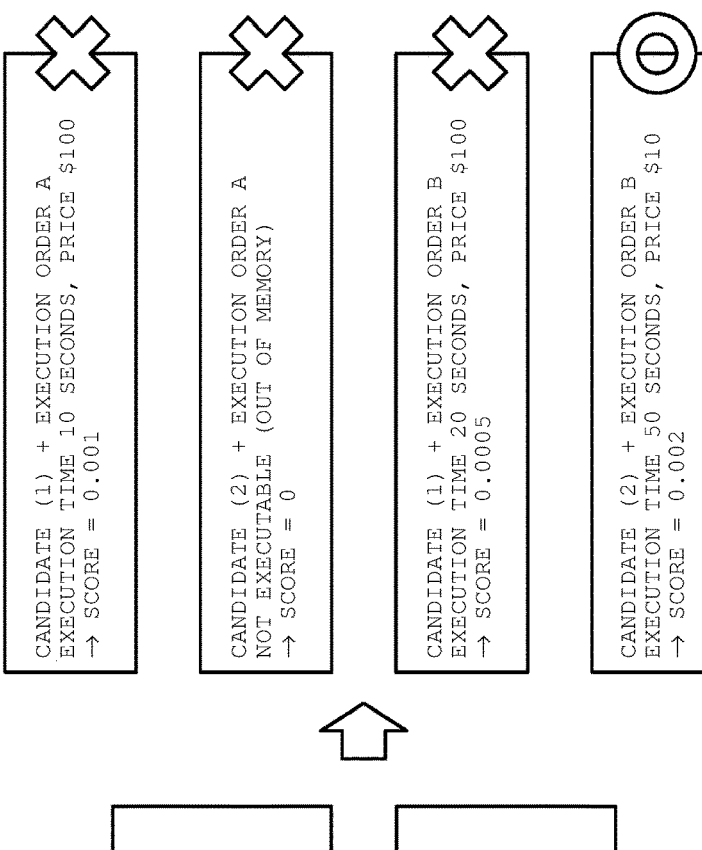

TASK EXECUTION ENVIRONMENT
CANDIDATE (1)
· HIGH PROCESSOR
PERFORMANCE
· LARGE MEMORY CAPACITY
· PRICE $100

EXECUTION ORDER A
SORT ORIGINAL DATA IN ORDER
OF AGE ON LARGE CAPACITY MEMORY
→ CALCULATE TOTAL SUM OF HEIGHTS
BY AGE

TASK EXECUTION ENVIRONMENT
CANDIDATE (2)
· LOW PROCESSOR
PERFORMANCE
· SMALL MEMORY CAPACITY
· PRICE $10

EXECUTION ORDER B
CALCULATE TOTAL SUM OF HEIGHTS
BY AGE FROM ORIGINAL DATA USING HASH
TABLE
→ SORT TOTAL SUM IN ORDER OF AGE

CANDIDATE (1) + EXECUTION ORDER A
EXECUTION TIME 10 SECONDS, PRICE $100
→ SCORE = 0.001

CANDIDATE (2) + EXECUTION ORDER A
NOT EXECUTABLE (OUT OF MEMORY)
→ SCORE = 0

CANDIDATE (1) + EXECUTION ORDER B
EXECUTION TIME 20 SECONDS, PRICE $100
→ SCORE = 0.0005

CANDIDATE (2) + EXECUTION ORDER B
EXECUTION TIME 50 SECONDS, PRICE $10
→ SCORE = 0.002

*FIG. 5*

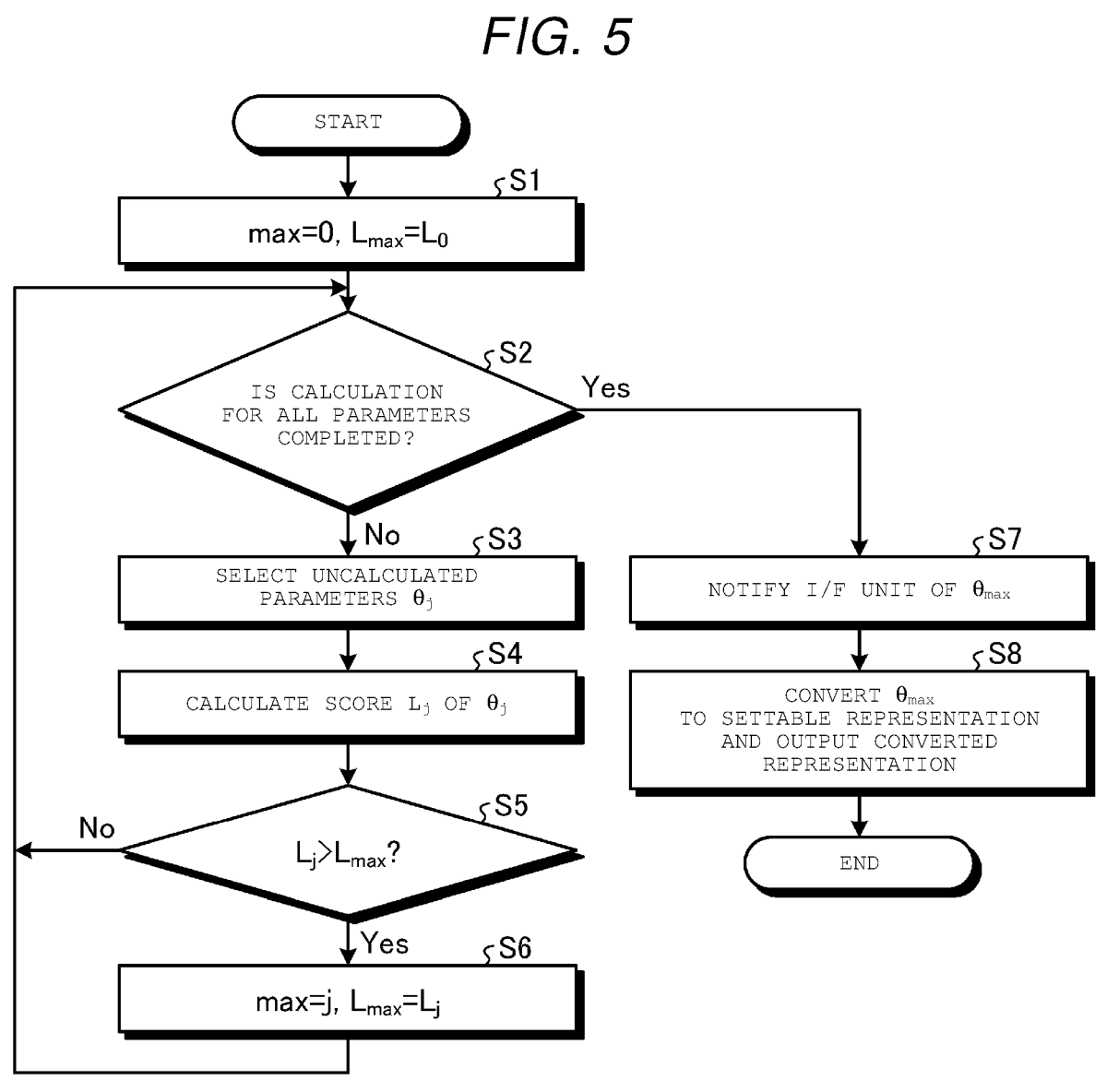

START

S1

$max=0$, $L_{max}=L_0$

S2

IS CALCULATION
FOR ALL PARAMETERS
COMPLETED?

No    Yes

S3

SELECT UNCALCULATED
PARAMETERS $\theta_j$

S4

CALCULATE SCORE $L_j$ OF $\theta_j$

S5

$L_j > L_{max}$?

No    Yes

S6

$max=j$, $L_{max}=L_j$

S7

NOTIFY I/F UNIT OF $\theta_{max}$

S8

CONVERT $\theta_{max}$
TO SETTABLE REPRESENTATION
AND OUTPUT CONVERTED
REPRESENTATION

END

Pc, Ps: PROCESSOR PERFORMANCE OF COMPUTER/STORAGE SERVER
B: BANDWIDTH OF NETWORK
R: READ PERFORMANCE OF STORAGE
N, M: DATA AMOUNT BEFORE AND AFTER SELECTION
C1, C2: LOAD COEFFICIENT OF SELECTION/AGGREGATION PROCESSING

*FIG. 7*

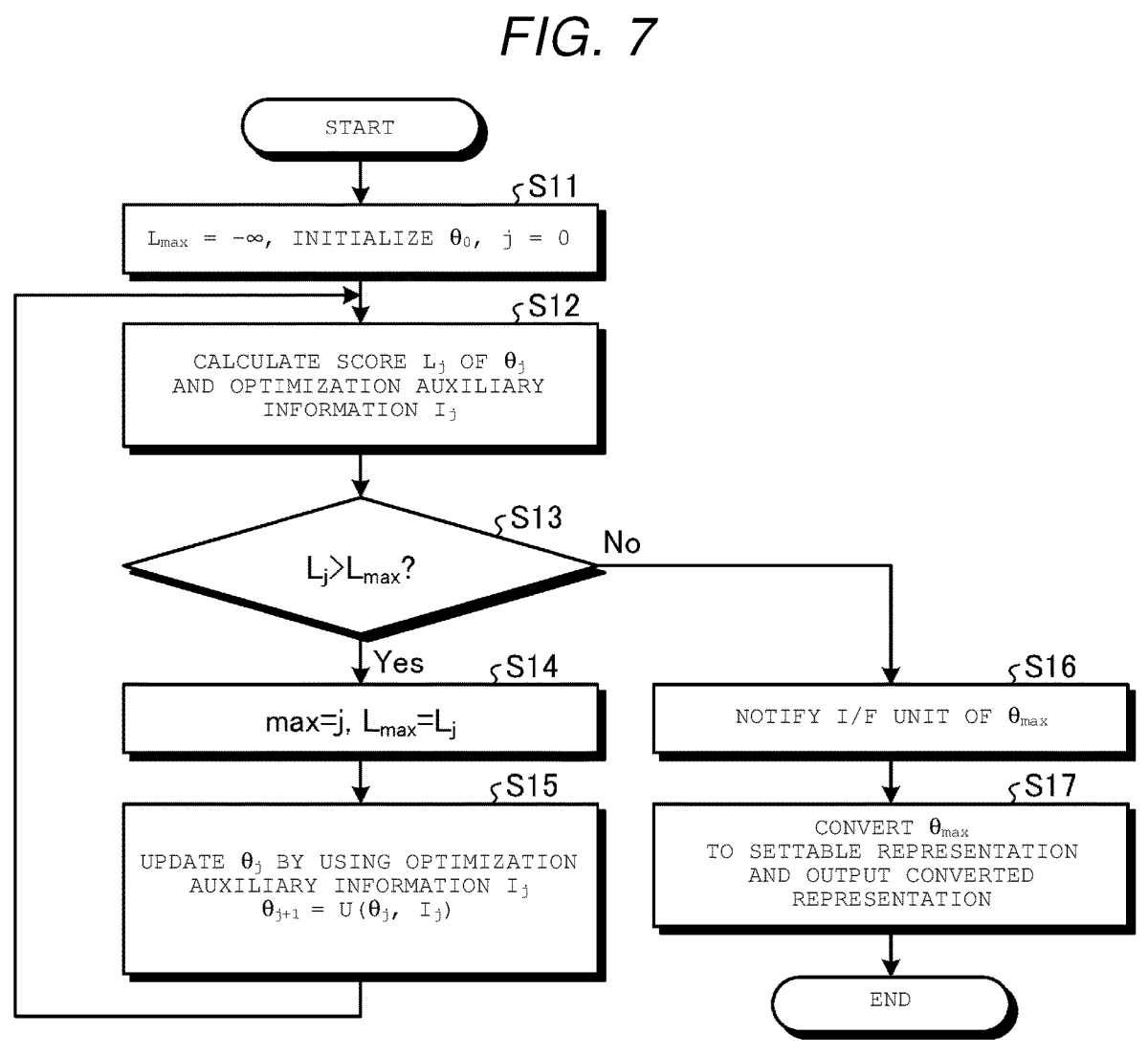

START

S11
$L_{max} = -\infty$, INITIALIZE $\theta_0$, $j = 0$

S12
CALCULATE SCORE $L_j$ OF $\theta_j$
AND OPTIMIZATION AUXILIARY
INFORMATION $I_j$ S13
$L_j > L_{max}$?

No

Yes

S14
max=j, $L_{max} = L_j$

S15
UPDATE $\theta_j$ BY USING OPTIMIZATION
AUXILIARY INFORMATION $I_j$
$\theta_{j+1} = U(\theta_j, I_j)$ S16
NOTIFY I/F UNIT OF $\theta_{max}$ S17
CONVERT $\theta_{max}$
TO SETTABLE REPRESENTATION
AND OUTPUT CONVERTED
REPRESENTATION

END

RESOURCE ALLOCATION OF A TASK

CROSS-REFERENCE TO RELATED APPLICATION(S)

This application is based upon and claims the benefit of priority from Japanese Patent Application No. 2022-046057, filed Mar. 22, 2022, the entire contents of which are incorporated herein by reference.

FIELD

Embodiments described herein relate generally to resource allocation of a task.

BACKGROUND

In an information processing device, resources are allocated based on dependency among subdivided processes for a task to be executed.

BRIEF DESCRIPTION OF THE DRAWINGS

FIG. 3 is a diagram showing an example of parameters used in the first embodiment.

FIG. 4 is a diagram showing an example of determining resource allocation in the first embodiment.

FIG. 5 is a flowchart showing a resource allocation determination procedure in the first embodiment.

FIG. 7 is a flowchart showing a resource allocation determination procedure in the second embodiment.

FIG. 8 is a block diagram illustrating hardware configuration of a resource allocation control device and a task execution device according to an embodiment.

DETAILED DESCRIPTION

Embodiments provide an information processing device and a method capable of allocating resources required for calculation processing more appropriately to a computer system that executes a process requested by a user.

In general, according to an embodiment, an information processing device includes a dependency information acquisition unit, a resource information acquisition unit, a score calculation unit, a search unit, and an output unit, and the dependency information acquisition unit acquires dependency information indicating subdivided process items that constitute a task and a dependency of the process items, the resource information acquisition unit acquires resource information that is information indicating what kind of resource allocation is possible for the task, the score calculation unit calculates a score for a processing procedure of the process items based on the dependency information, and the resource allocation, the search unit searches for a combination of which the score is excellent, and the output unit outputs resource allocation corresponding to the excellent score found by the search unit.

A task execution system including a resource allocation control device, which is an information processing device according to embodiments, will be described below in detail with reference to the accompanying drawings. The present disclosure is not limited to the embodiments.

First Embodiment

Figures 1, 2:
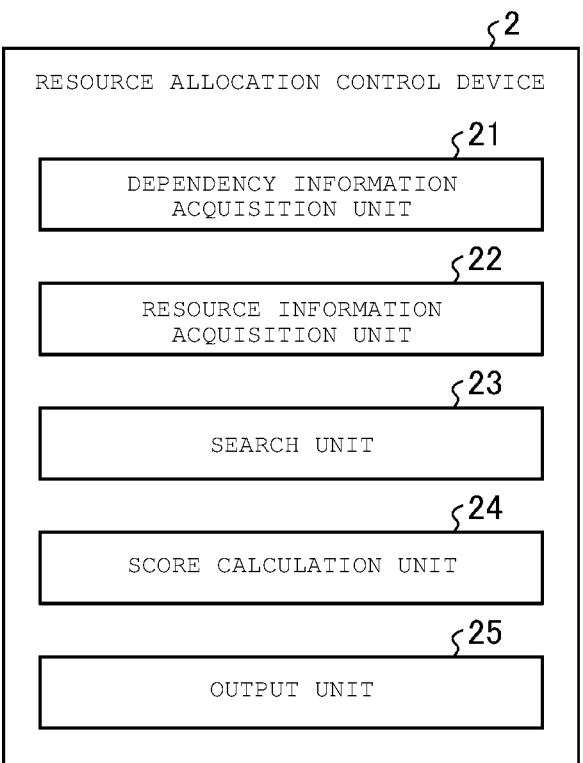
FIG. 1 is a block diagram showing an example of a configuration of a task execution system according to a first embodiment.
FIG. 2 is a block diagram showing an example of a functional configuration of a resource allocation control device according to the first embodiment.

FIG. 1 is a schematic diagram showing an example of a task execution system 1 according to a first embodiment.

The task execution system 1 includes a resource allocation control device 2 and a task execution device 3. The task execution device 3 includes a plurality of server devices. For example, a server device 31 and a server device 32 function as the task execution device 3. The server device 31 and the server device 32 can communicate data with each other via a network.

The resource allocation control device 2 and the task execution device 3 are connected to each other via a network.

The resource allocation control device 2 is an information processing device such as a personal computer (PC), a workstation, or a server device.

The resource allocation control device 2 is a device that determines a computing resource on the task execution device to which the task is to be allocated. Here, the task is a program or the like that includes a plurality of process steps, requested by a user. The task execution device 3 is a device (e.g., computer system) that actually executes the task by using a computing resource specified by the resource allocation control device 2. That is, the task execution device 3 is a computer system that executes the process requested by the user. Here, the computing resource is a resource needed for processing such as a processor, memory, storage, and network, and the task execution device 3 can allocate a part or all of the computing resources to execution of a certain task. For example, one of cores of a multi-core processor, a part of an available memory area, and a part of a network bandwidth may be allocated to the task.

Incidentally, in some cases, the same processing result is obtained even if the processing procedure of the subdivided process steps of the task is changed. For example, a process step of inner joining tables on a relational database and a process step of selecting rows of the table by conditional expressions can obtain the same processing results even if the order of the process steps is reversed. Further, there are a plurality of procedures such as hash join and merge join as a specific execution procedure of the inner joining process, and the same processing result can be obtained regardless of which one is selected. By considering combinations of a plurality of processing procedures for executing a task, the resource allocation control device 2 determines a combination of processing procedures that is able to execute the task as quickly as possible with as few resource allocations as possible.

FIG. 2 is a block diagram showing an example of a functional configuration of the resource allocation control device 2 according to the first embodiment. As shown in FIG. 2, the resource allocation control device 2 includes a dependency information acquisition unit 21, a resource information acquisition unit 22, a search unit 23, a score calculation unit 24, and an output unit 25.

The dependency information acquisition unit 21 acquires dependency information indicating subdivided process steps of a task and a dependency among the process steps. When the dependency information acquisition unit 21 acquires the task, the dependency information acquisition unit 21 analyzes the task and subdivides the task into a plurality of process steps. Then, the dependency information acquisition unit 21 specifies the dependency among the plurality of process steps.

Here, the dependency information is information for specifying the execution order among the process steps. For example, when output contents of a first process step correspond to input contents of a second process step, the second process step needs to be executed after the first process step is executed. The dependency information acquisition unit 21 determines the input contents and output contents of each process step and specifies the output contents of other process steps necessary for determining the input contents of each process step, thereby specifying the dependency among the plurality of process steps to generate information indicating the dependency among the process steps. In this way, the dependency information acquisition unit 21 acquires the dependency information by generating the information indicating the dependency among the process steps. The dependency information acquisition unit 21 may acquire the dependency information from an external device.

The resource information acquisition unit 22 acquires resource information, which is information indicating what kind of resource allocation is possible for the task. The resource information acquisition unit 22 acquires resource information from each of the server device 31 and the server device 32 included in the task execution device 3. Here, FIG. 3 shows an example of parameters of the resource information.

As shown in FIG. 3, the parameters include type/performance information for an computing unit, type/performance information for a memory and a storage, and configuration/performance information for a network. The type/performance information for the computing unit and the type/performance information for the memory and the storage are different information depending on the task execution device 3, and are information that can be changed by adding a memory and so on. The configuration/performance information for the network is information regarding the configuration and performance of the network used by the task execution device 3.

The resource information acquisition unit 22 may acquire information on current free resources from the server device 31 and the server device 32 as resource information. Further, the resource information acquisition unit 22 may acquire resource information that can be allocated to a virtual server or container implemented by virtualization technology instead of a physical server device. The resource information that can be allocated to the virtual server or container can be calculated from information such as an operating status of an hardware infrastructure in which the virtual server or container is operating and the amount of unused resources. Further, the resource information acquisition unit 22 may acquire computing resource information that can be added to or detached from a hardware infrastructure such as a physical computer cluster.

The search unit 23 searches for combinations of a plurality of processing procedures of the process steps based on the dependency information and resource allocations for the task.

The score calculation unit 24 calculates a score with respect to each of the combinations searched for by the search unit 23. Here, the score is calculated based on combinations of a plurality of processing procedures of process steps based on the dependency information and resources allocated to process steps in each pattern. In addition, the higher the score, the more appropriate the combination. In general, the lower the task execution cost, execution time, and power consumption, the higher the score. Furthermore, in general, the higher the probability that the task can be executed correctly, that is, the higher the reliability, the higher the score. It is noted that the score calculation standard is not limited to those described above.

The output unit 25 outputs the resource allocation so that the score calculated by the score calculation unit 24 is as high as possible.

Subsequently, with reference to FIG. 4, an example will be described in which the resource allocation control device 2 calculates scores for a plurality of execution procedures of process steps of the task and a plurality of resource allocations based on the dependency information.

In the example, the resource information include information on a resource allocation candidate (1) and information on a resource allocation candidate (2). The resource allocation candidate (1) represents, for example, the amount of resources that can be used for calculation when the server device 31 is allocated for task execution. The resource allocation candidate (2) represents, for example, the amount of resources that can be used for calculation when the server device 32 is allocated for task execution. The server device 31 of the resource allocation candidate (1) is shown to be a server device having a high processor performance and a larger memory capacity, and having a usage price of $100 per unit time. Further, the server device 32 of the resource allocation candidate (2) is shown to be a server device having a low processor performance and a smaller memory capacity, and having a usage price of $10 per unit time. In this example, each resource allocation candidate represents assignment of single server, but it is possible to add new resource allocation candidate which represents more complex assignment: for example, assigns 25% of the processors of the server device 31 and 50% of the memory of the server device 32.

In the example, the task is to sort, by age, the total sum of height data for each age. The search unit 23 searches for a pattern of an execution order A and a pattern of an execution order B shown in FIG. 4 based on dependency information among process steps for the task. The search unit 23 searches for a combination of any of the resource allocation candidate (1) or the resource allocation candidate (2) and any of the execution order A and the execution order B. The score calculation unit 24 calculates a score, which is a score in each combination. It is assumed that the shorter the execution time, the higher the score, and the lower the price, the higher the score.

Among the four combinations searched for by the search unit 23, the resource allocation candidate (2) has the highest score when the task is executed in the execution order B. The output unit 25 outputs the resource allocation candidate (2) having the highest score as the optimum resource allocation.

Subsequently, a score calculation procedure by the resource allocation control device 2 according to the first embodiment will be described with reference to a flowchart shown in FIG. 5.

Here, it is assumed that the resource allocation control device 2 acquires the resource information and the dependency information. First, the resource allocation control device 2 sets an initial value (step S1). Specifically, the resource allocation control device 2 sets a variable max to 0. Further, $L_{max}$=score $L_0$ is set.

Subsequently, the resource allocation control device 2 determines whether or not calculation of the scores for all of resource allocation candidates is completed (step S2). In step S2, when the resource allocation control device 2 does not complete the calculation for all resource allocation candidates (No in step S2), the search unit 23 selects an uncalculated resource allocation candidate (step S3). The resource allocation candidate is represented by a parameter $\theta_j$. Further, the search unit 23 selects the execution order most suitable for the parameter $\theta_j$. Then, the score calculation unit 24 calculates a score L based on the selected resource allocation candidate and the selected execution order.

In step S5, the scores $L_j$ and $L_{max}$ are compared, and when the score $L_j$ is larger than $L_{max}$ (Yes in step S5), the search unit 23 sets the variable max as j and inputs the value of the score L into $L_j$ (step S6), and the process returns to step S2.

In step S5, the scores $L_j$ and $L_{max}$ are compared, and when the score $L_j$ is not greater than $L_{max}$ (No in step S5), the process returns to step S2.

In step S2, when the resource allocation control device 2 determines that the calculation has been completed for all resource allocation candidates (Yes in step S2), the resource allocation control device 2 notifies an I/F unit connected to the output unit 25 of the resource allocation candidate that yields $L_{max}$ (step S7). The output unit 25 outputs information of the resource allocation candidate (step S8).

In the resource allocation control device 2 according to the first embodiment, the dependency information acquisition unit 21 acquires dependency information indicating subdivided process steps of a task and a dependency among the process steps. The resource information acquisition unit 22 acquires resource information, which is based on a plurality of parameters of a device capable of executing the task. The search unit 23 searches for a combination of one processing procedure of the process steps based on the dependency information and one resource allocation candidate for the process steps of the processing procedure. The score calculation unit 24 calculates a score for each combination. The output unit 25 outputs information of a resource allocation candidate that yields a higher (e.g., highest) score.

In this way, the resource allocation control device 2 searches for combinations of a processing procedure of process steps based on the dependency information and the resource allocation candidate for the process steps of the processing procedure. Thus, the resource allocation control device 2 searches for a plurality of processing procedures and a plurality of combinations of the processing procedures and find more appropriate resource allocation candidate as compared with the case of allocating resources without considering changing the processing procedure. As a result, it possible to allocate resources more appropriately.

Further, the resource allocation control device 2 may acquire information on free resources as resource information. In this case, the resource allocation control device 2 can calculate the score based on the resources currently available.

Second Embodiment

In the first embodiment, the case of calculating the scores of all combinations of a plurality of processing procedures of process steps based on the dependency information and a plurality of resource allocation candidates has been described. However, calculating the scores for all combinations may increase the processing load. To address the issue, in the second embodiment, the resource allocation candidate is determined using optimization auxiliary information.

Figure 6:
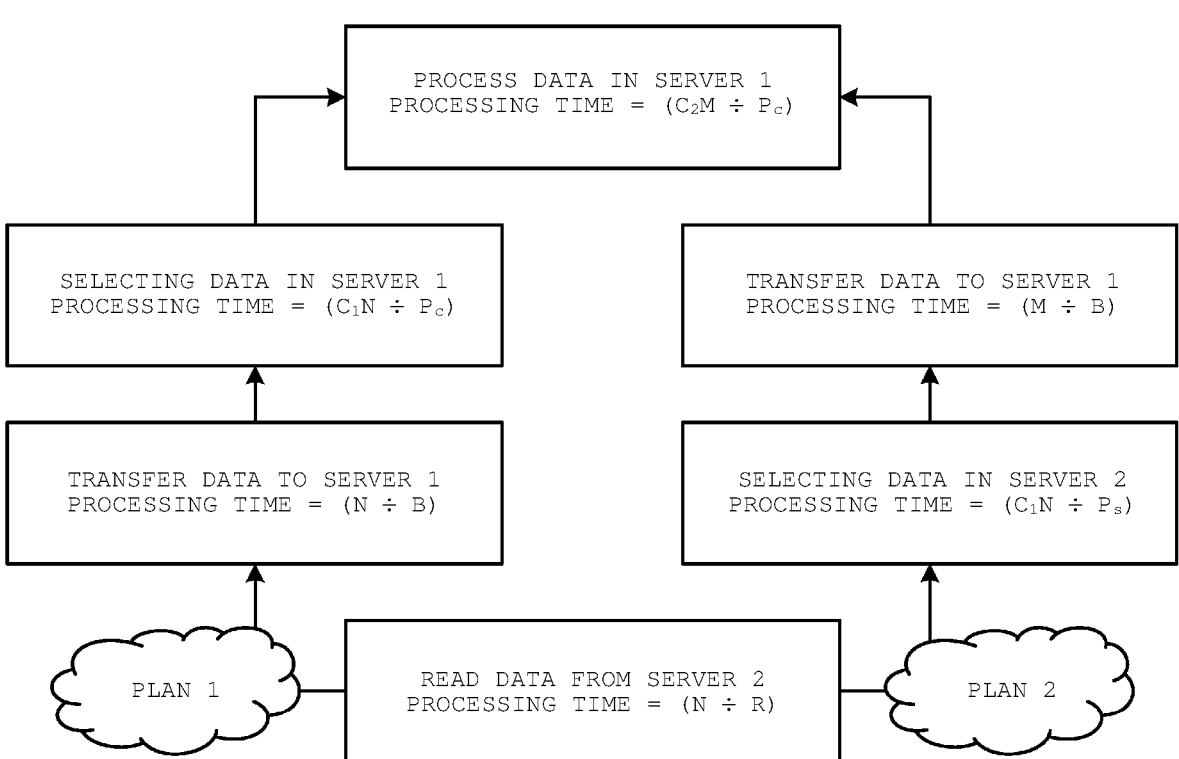
FIG. 6 is a diagram showing an example of a plan in a second embodiment.

FIG. 6 shows an example of processing procedures of a task. There are two processing procedures (may be referred to as plans) based on the execution order of subdivided process steps of the task. It is assumed that a server 1 is a computer server and a server 2 is a storage server.

In a plan 1, data is read from the server 2 (server device 32), the data is transferred to the server 1 (server device 31), the data is selected in the server 1, and the selected data is processed by the server 1. That is, in the plan 1, after the data is read by the server 2, the data is processed only by the server 1.

A processing time for reading the data from the server 2 is N/R. N is the amount of data before the selection. R is a read performance of the storage of the server 2, which is a storage server. A processing time for transferring data to the server 1 is N/B. B is a bandwidth of a network connecting the server 1 and the server 2. A processing time for selecting the data by the server 1 is $C_1 N/P_c$. $C_1$ is a load coefficient for the selection processing. $P_c$ is a processor performance of the server 1. A processing time for processing the data on the server 1 is $C_2 M/P_c$. $C_2$ is a load coefficient for the aggregation processing. M is the amount of data after the selection.

In a plan 2, data is read from the server 2, the data is selected by the server 2, the selected data is transferred to the server 1, and the selected data is processed by the server 1. That is, in the plan 2, data is transferred to the server 1 after the process of selecting the data is executed by the server 2.

A processing time for selecting the data by the server 2 is $C_1 N/P_s$. $P_s$ is a processor performance of the server 2. A processing time for transferring data to the server 1 is M/B.

A processing time of the plan 1 is $t_1 = N/R + N/B + C_1 N/P_c + C_2 M/P_c$. A processing time of the plan 2 is $t_2 = N/R + C_1 N/Ps + M/B + C_2 M/P_c$.

The scores for the plan 1 and the plan 2 are set to $L_1 = 1/t_1$ and $L_2 = 1/t_2$, respectively. Further, when the higher score of the plan 1 and the plan 2 is selected, the expression of the score as a function of the parameters $\theta = (Pc, Ps, B, R)$ (processor performance, bandwidth, read performance) can be represented as a score function $L(\theta) = max (L_1, L_2)$.

Further, an approximate function of the original score may be employed as the score function $L(\theta)$. For example, using the weighted sum of the scores of the plan 1 and the plan 2, the score function $L(\theta)$ may be $L(\theta) = 0.6 \times + 0.4 \times L_2$.

Here, information indicating a correspondence between the parameters and the score function $L(\theta)$, which is used to find a parameter $\theta = (Pc, Ps, B, R)$ (processor performance, bandwidth, read performance) that can maximize the score function $L(\theta)$ is used as the optimization auxiliary information.

For example, the optimization auxiliary information may be a score function $L(\theta)$ for calculating a score for the parameters $\theta$ itself. In this case, by calculating the parameters $\theta$ that maximize the score function $L(\theta)$ by using a technique such as mathematical optimization, it is possible to determine the parameters $\theta$ (i.e., resource allocation) that can make the score higher.

In another example, the optimization auxiliary information may be a gradient $\partial L/\partial a \theta$ of the score function $L(\theta)$. This can be regarded as a ratio of instantaneous change of the score function $L(\theta)$ to instantaneous change of the parameters $\theta$. In this case, by calculating the parameters $\theta$ that maximize the score function $L(\theta)$ by using a technique such as the gradient method, it is possible to determine the parameters $\theta$ (i.e., resource allocation) that can make the score higher.

In still another example, the optimization auxiliary information may be the degree of change in the score when the parameters $\theta$ are increased by, for example, 10%. Similar to the gradient, it can be regarded as a ratio of the change of the score function L to the change of the parameters θ. In this case, by calculating the parameters θ that maximize the score function L(θ) by using a technique such as the gradient method, it is possible to determine the parameters θ (i.e., resource allocation) that can make the score higher.

Subsequently, a score calculation procedure by the resource allocation control device 2 according to the second embodiment will be described with reference to a flowchart shown in FIG. 7.

Here, it is assumed that the resource allocation control device 2 acquires the resource information and the dependency information. First, the resource allocation control device 2 initializes $L_{max}$ and $\theta_0$ (step S11). Further, a variable j is set to 0.

The score calculation unit 24 calculates a score $L_j$ based on parameters $\theta_j$ and optimization auxiliary information $I_j$ (step S12).

In step S13, scores $L_2$ and $L_{max}$ are compared, and when the score $L_j$ is larger than $L_{max}$ (Yes in step S13), the search unit 23 sets the variable max as j and the score $L_j$ as $L_{max}$ (step S14), and the process proceeds to step S15.

In step S15, the score calculation unit 24 updates a parameter $\theta_{j+1}$ using the optimization auxiliary information $I_j$ (step S15), and the process returns to step S12.

In step S13, the scores $L_j$ and $L_{max}$ are compared, and when the score $L_j$ is not greater than $L_{max}$ (No in step S13), the process proceeds to step S16. An I/F unit connected to the output unit 25 is notified of the parameters $\theta_j$ that yields $L_{max}$ (step S16). The output unit 25 outputs information of the parameters $\theta_j$ that yields $L_{max}$ (step S17).

The resource allocation control device 2 according to the second embodiment calculates the optimization auxiliary information used for finding parameters that yields a higher score, updates the parameters (i.e., resource allocation candidate) based on the optimization auxiliary information, and calculates the score by using the updated parameters.

As described above, when the result of calculating the optimization auxiliary information, updating the parameters based on the optimization auxiliary information and calculating the score does not improve from the score, the resource allocation control device 2 can infer that there is no need to change the parameters any more, and can appropriately find parameters that yields a preferable score without calculating the score for all combinations.

Hardware Configuration

Figure 8:
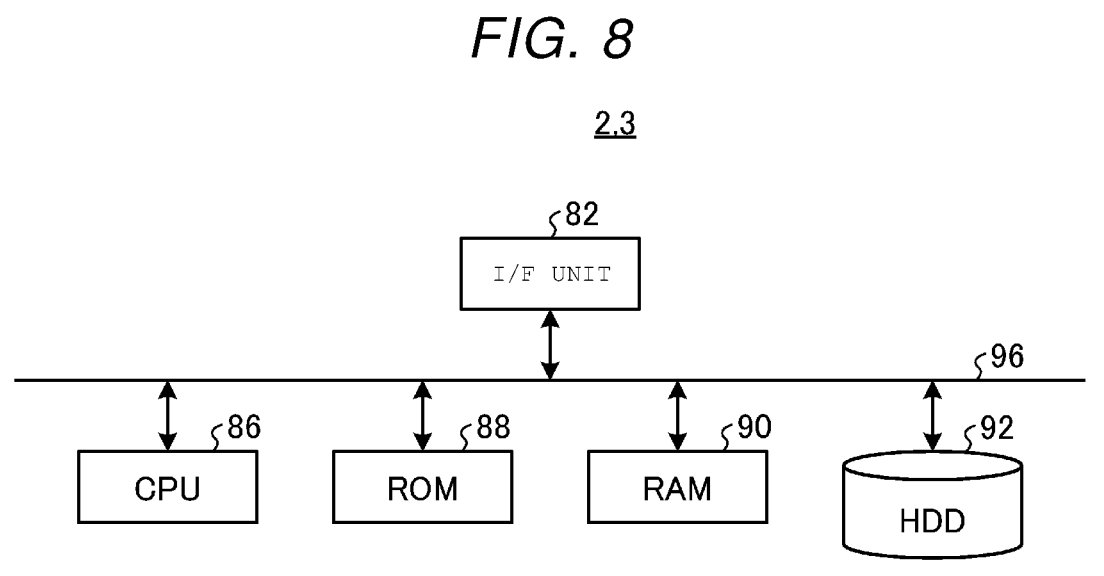

Next, an example of a hardware configuration of the resource allocation control device 2 and the task execution device 3 (i.e., server device 31, server device 32) of the first embodiment and the second embodiment will be described. FIG. 8 is a block diagram illustrating an example of a hardware configuration of the resource allocation control device 2 and the task execution device 3 of the first embodiment and the second embodiment.

The resource allocation control device 2 and the task execution device 3 of the first embodiment and the second embodiment include a control device such as a CPU 86, storage devices such as a read only memory (ROM) 88, a random access memory (RAM) 90, and a hard disk drive (HDD) 92, an interface (I/F) unit 82 that is an interface with various devices, and a bus 96 that connects the above components to each other, and is built as a hardware configuration of a computer.

In the resource allocation control device 2 and the task execution device 3 of the first embodiment and the second embodiment, the CPU 86 reads a program from the ROM 88 onto the RAM 90 and executes the program, whereby each of the above components is implemented on the computer.

The program for executing each of the above processes executed by the resource allocation control device 2 and the task execution device 3 of the first embodiment and the second embodiment may be stored in the HDD 92. Further, the program for executing each of the above processes executed by the resource allocation control device 2 and the task execution device 3 of the above embodiments may be provided in advance in the ROM 88.

Further, the program for executing the above processes executed by the resource allocation control device 2 and the task execution device 3 of the first embodiment and the second embodiment may be a file in an installable format or an executable format, and may be stored in a computer-readable storage medium such as a CD-ROM, CD-R, memory card, a digital versatile disk (DVD), or a flexible disk (FD), and may be provided as a computer program product. Further, the program for executing the above processes executed by the resource allocation control device 2 and the task execution device 3 of the first embodiment and the second embodiment may be stored on a computer connected to a network such as the Internet, and may be provided by being downloaded via the network. Further, the program for executing the above processes executed by the resource allocation control device 2 and the task execution device 3 of the first embodiment and the second embodiment may be provided or distributed via a network such as the Internet.

While certain embodiments have been described, these embodiments have been presented by way of example only, and are not intended to limit the scope of the disclosure. Indeed, the novel embodiments described herein may be embodied in a variety of other forms; furthermore, various omissions, substitutions, and changes in the form of the embodiments described herein may be made without departing from the spirit of the disclosure. The accompanying claims and their equivalents are intended to cover such forms or modifications as would fall within the scope and spirit of the disclosure.

What is claimed is:

1. A method for allocating processes of a task to a plurality of servers in a network, the method comprising:

acquiring dependency information of the task, the dependency information including processes of the task and dependency relationships among the processes that restrict orders of the processes;

determining a plurality of processing procedures that can implement the task based on the acquired dependency information, each of the processing procedures including one or more first processes to be performed by one server and then one or more second processes to be performed by another server;

acquiring resource information of the servers, the resource information of the servers including a plurality of parameters related to processing capabilities of the servers;

calculating a score representing a processing suitability for the task with respect to each of a plurality of combinations, each of which is a combination of one of the processing procedures and two of the servers, based on the resource information, wherein said calculating the score comprises:

calculating a score for one of the combinations using a first function of the parameters; and selecting a next one of the combinations for which the score is to be calculated based using a second function of the parameters, the second function comprising at least one of a derivative, a partial derivative, or a gradient of the first function;

selecting one of the combinations with which the task is to be implemented based on the calculated scores; and controlling a first server of the selected combination to perform the one or more first processes of the task in accordance with the processing procedure of the selected combination and then a second server of the selected combination to perform the one or more second processes of the task in accordance with the processing procedure of the selected combination.

2. The method according to claim 1, wherein the parameters include a first parameter representing a processing time taken by a server to implement a process of the task and a second parameter representing a transmission time taken for transmission of data between servers for succession of processes of the task.

3. The method according to claim 1, wherein the score is determined using a function of the parameters.

4. The method according to claim 1, wherein said selecting comprises:

determining whether a score of one of the combinations is greater than a highest score among scores that have been determined; and upon determining that the score of one of the combination is not greater than the highest score, selecting one of the combinations with the highest score to be the combination with which the task is to be implemented.

* * * * *